May 20, 1941.   E. K. JOHANSEN   2,242,396
COMBINED FLUID PRESSURE CLUTCH, BRAKE, AND FLYWHEEL
Filed March 5, 1940   5 Sheets-Sheet 1

Inventor
Einar K. Johansen
By [signature]
Atty.

May 20, 1941.   E. K. JOHANSEN   2,242,396
COMBINED FLUID PRESSURE CLUTCH, BRAKE, AND FLYWHEEL
Filed March 5, 1940   5 Sheets-Sheet 2
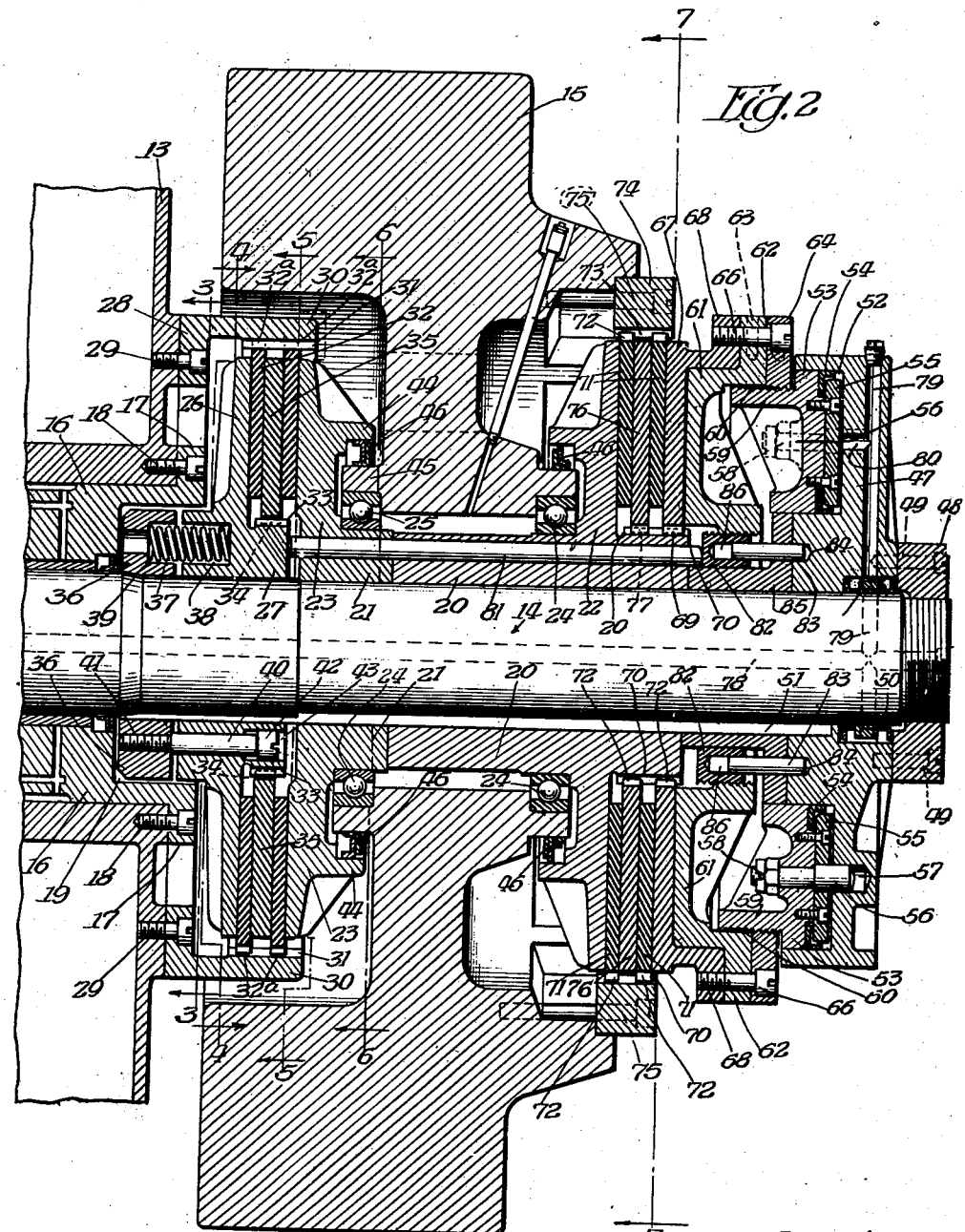
Fig. 2
Inventor
Einar K. Johansen
By
Atty.

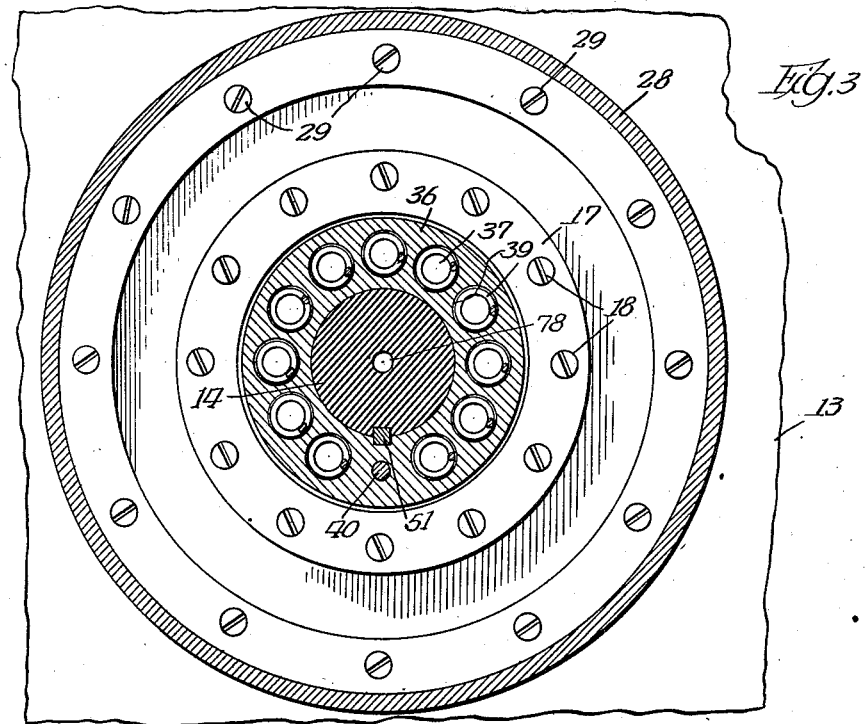
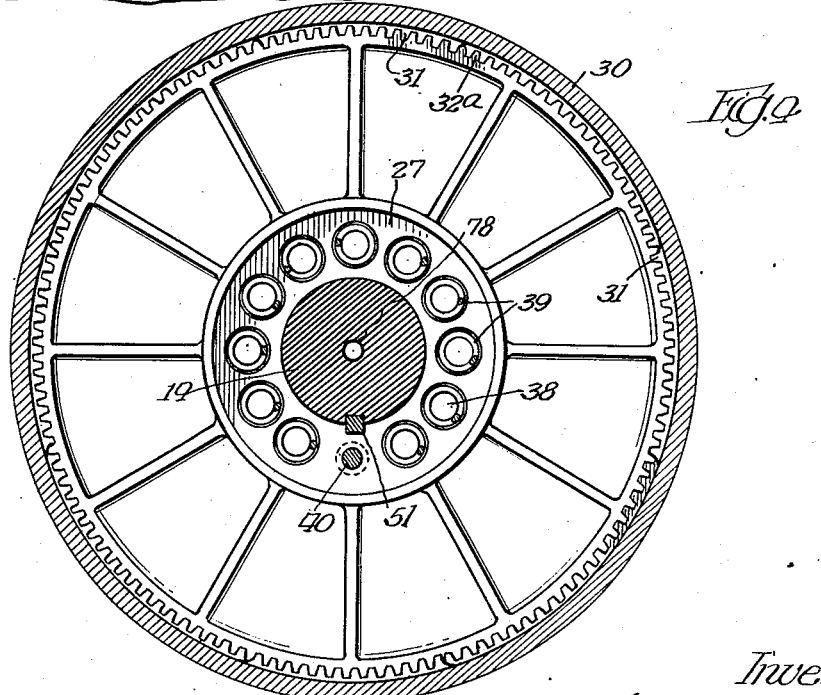

Inventor
Einar K. Johansen

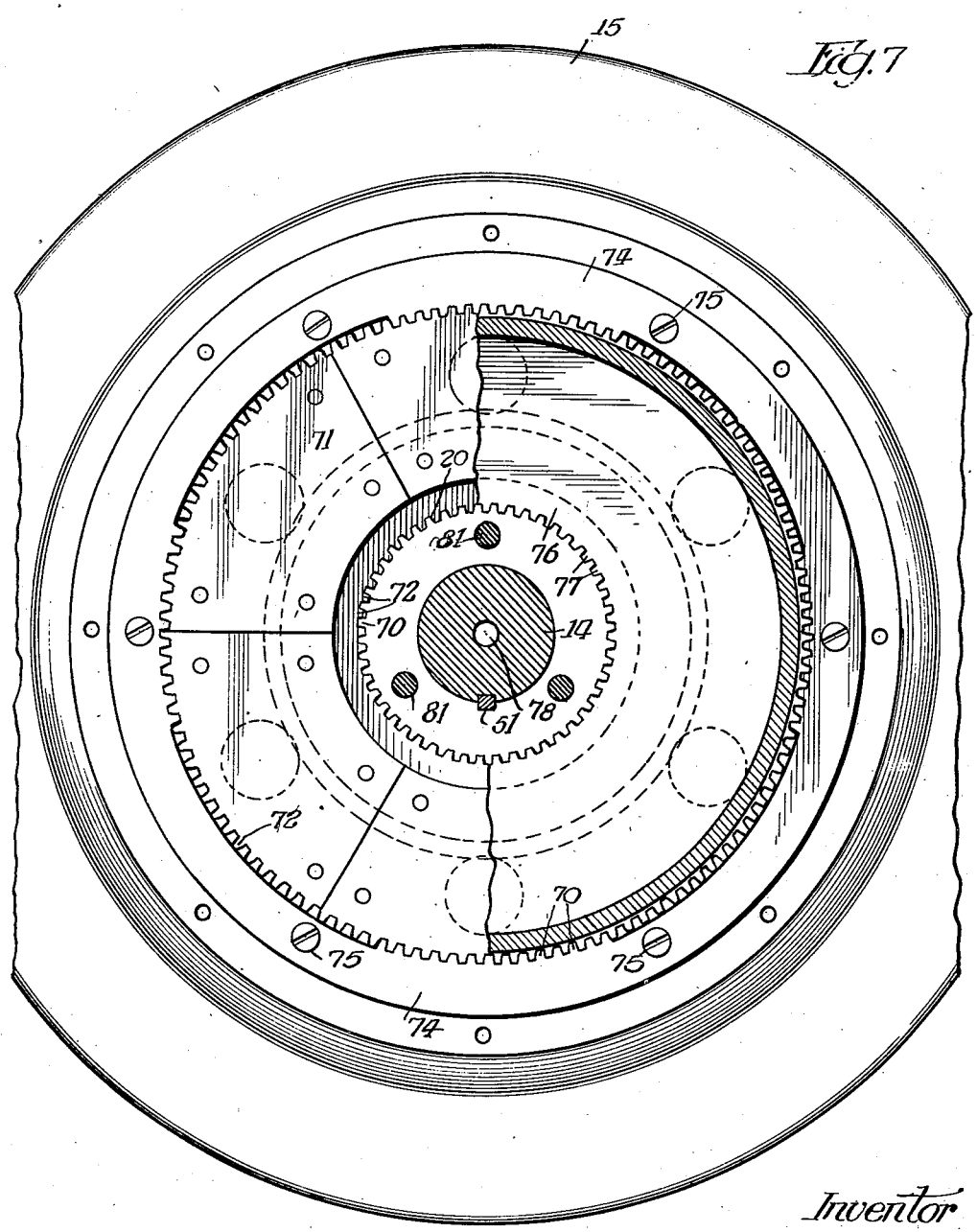

Patented May 20, 1941

2,242,396

UNITED STATES PATENT OFFICE 2,242,396

COMBINED FLUID PRESSURE CLUTCH, BRAKE, AND FLYWHEEL

Einar K. Johansen, Chicago, Ill., assignor to Clearing Machine Corporation, Chicago, Ill., a corporation of Illinois Application March 5, 1940, Serial No. 322,302

13 Claims. (Cl. 192—18)

This invention relates to improvements in combined fluid pressure clutch, brake and fly wheel particularly adapted, though not necessarily limited in use with metal working presses of very high ton capacity.

In presses of this character the clutch, brake and fly wheel are generally located adjacent one side of the press, and as these elements are of necessity very heavy in order to perform the required duty, they constitute a large solid heavy revolving mass.

In order heretofore to properly support them it has been necessary to provide bearing brackets which also serve the purpose of providing a stationary means to which the stationary member of the brake has been fastened. These brackets add very materially to the overhanging weight which projects from the press frame and besides occupy a considerable space.

It is one of the objects of the present invention to provide a combined clutch, brake and fly wheel of such construction and arrangement that the entire structure will be materially shortened and the overhanging supporting bracket will be dispensed with as the stationary member of the brake will be fastened directly to the outside of the press crown or press frame.

A further object is to provide an improved structure of this character in which the fly wheel will be placed closer to the center of the length of the drive shaft than has heretofore been possible, with the result that the shaft can be journaled in bearings at either end and the fly wheel will be supported by these bearings.

A further object is to place the adjustment means for both the clutch and brake in close proximity to each other and they may be provided with a common lock, at the same time the brake and clutch may be independently adjusted and such adjustment is readily accessible from the outside of the unit.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a view in elevation of a press having a combined clutch, brake and fly wheel unit constructed in accordance with the principles of this invention applied thereto.

Figure 2 is an enlarged detail vertical sectional view of the unit.

Figure 3 is a sectional view taken on line 3—3 Figure 2.

Figure 4 is a sectional view taken on line 4—4 Figure 2.

Figure 7 is a sectional view taken on line 7—7 Figure 2.

Figure 1:
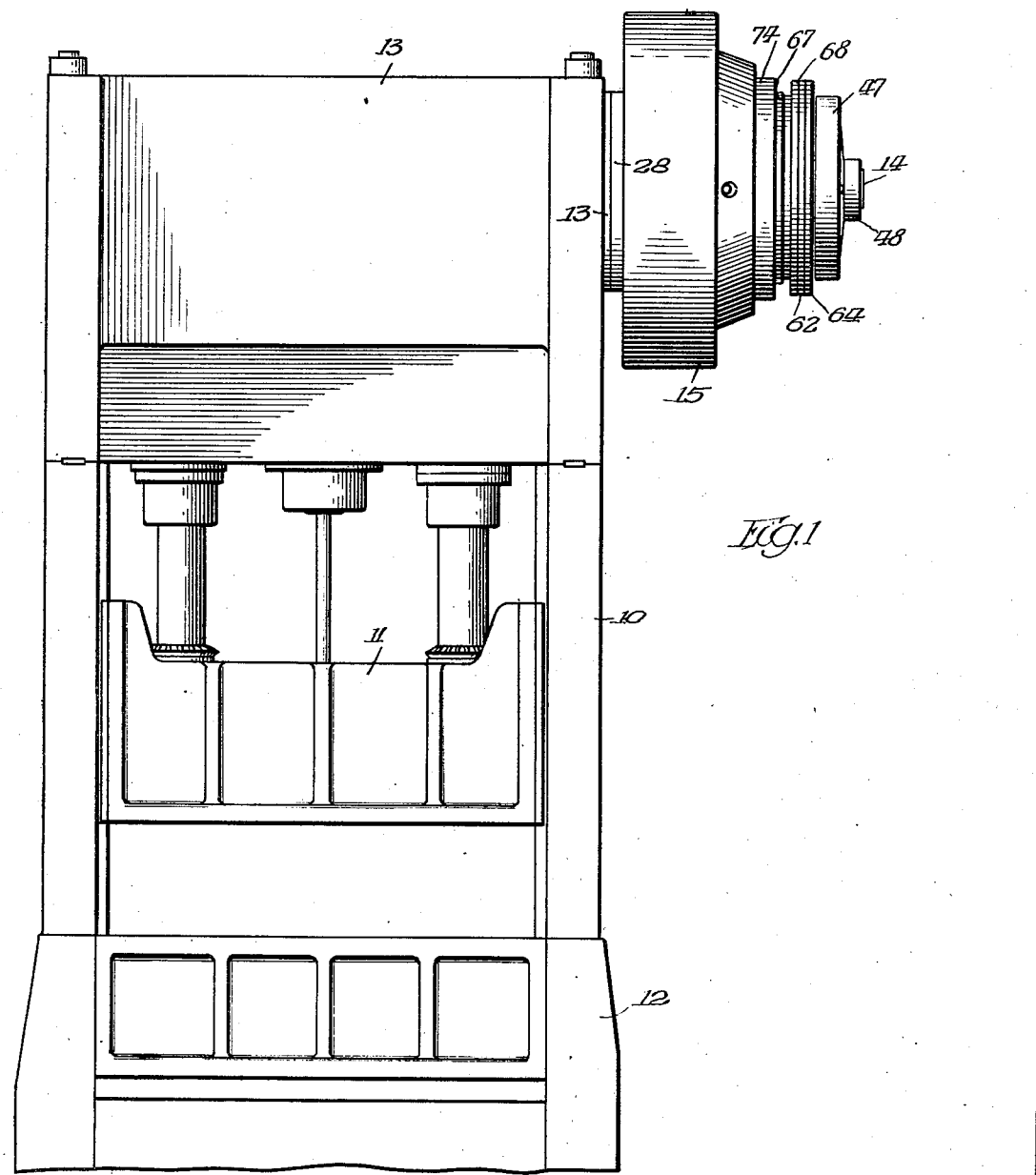
Figure 5:
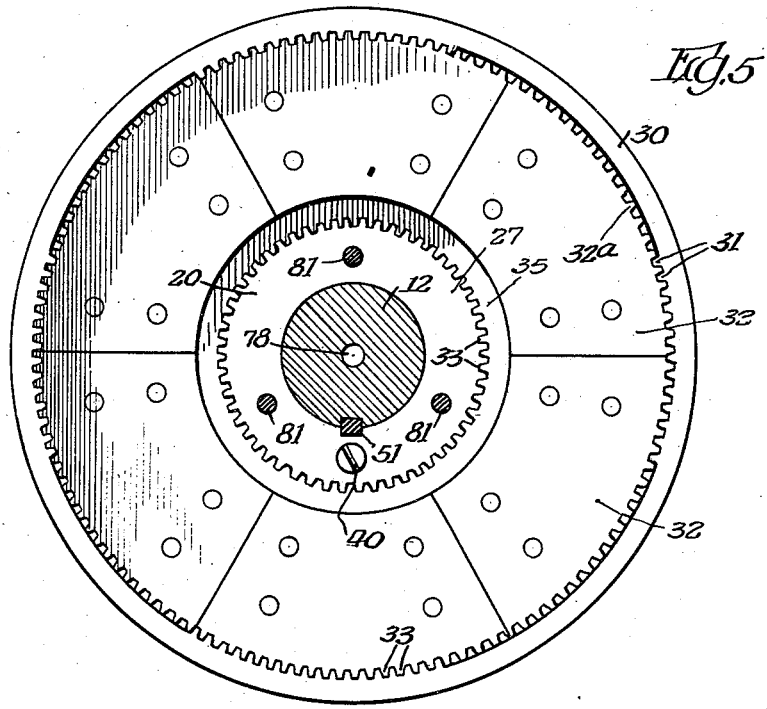
Figure 5 is a sectional view taken on line 5—5 Figure 2.
Figure 6:
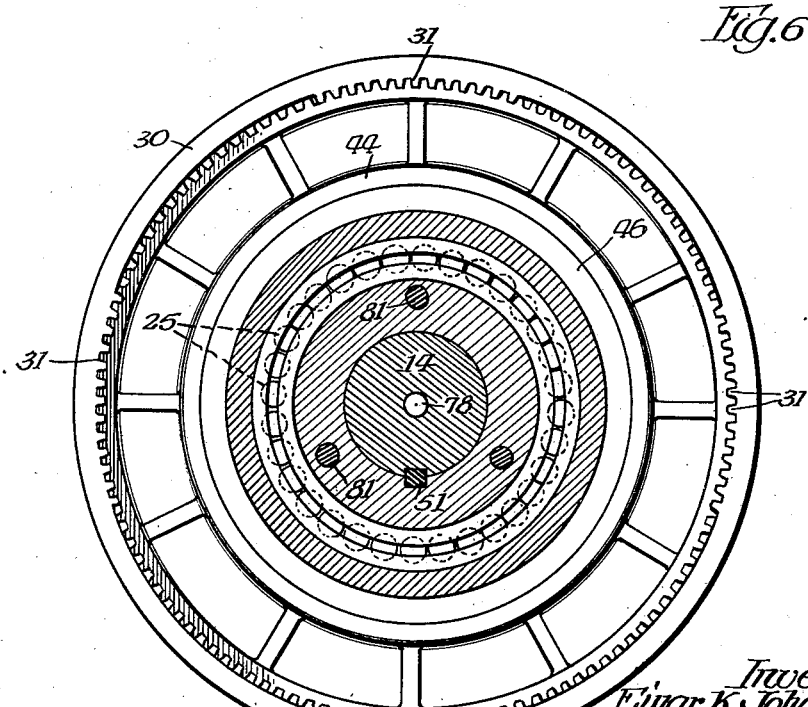
Figure 6 is a sectional view taken on line 6—6 Figure 2.

Referring more particularly to the drawings, the numeral 10 designates generally a press having a reciprocating slide 11, base 12 and a crown 13 of any desired size and configuration.

Extending across the crown and journaled in suitable bearings is a shaft 14 and this shaft projects beyond one side of the crown for a distance sufficient to permit mounting thereon a unit comprising a fly wheel 15 and clutch and brake mechanisms.

A bearing member 16 projects into the crown through one of the walls thereof and is secured in position and is provided with a flange 17 which latter contacts the outer face of the wall of the crown and is secured in position by means of suitable fastening bolts 18. This bearing 16 is provided with a recess 19 for a purpose to be set forth.

Secured to the shaft 14 for rotation therewith is a hub preferably comprising two members 20—21 and these sections are respectively provided with circumferential flanges 22—23, the flange 22 comprising a portion of a clutch mechanism to be hereinafter described and the flange 23 of the section 21 comprising a portion of a brake mechanism also to be later described.

Supported by the hub thus formed and between the flanges 22—23 are bearings 24—25, preferably of the roller type, and upon these bearings the fly wheel 15 is mounted, the hub of the fly wheel being also disposed between the flanges 22—23. The fly wheel is spaced a short distance from the wall 13 of the crown and in the space there is provided another element 26 which constitutes a portion of the brake mechanism that co-operates with the flange 23. This brake element 26 is provided with a hub 27 through which the shaft 14 passes and which hub is secured to the shaft for rotation therewith.

An annular member 28 abuts the outer face of the wall of the crown 13 and is secured thereto in any suitable manner such as by means of bolts 29. This member 28 is provided with a flange 30 which extends over the brake elements 23—26 and encompasses them, the flange 30 being provided with a series of teeth 31 of substantial length and with which teeth peripheral teeth 32—a on annular friction elements 32 intermesh so as to hold the elements 32 against rotation but adapting them for lateral movement with respect to each other and in directions toward and away from the proximate face of the wall of the crown 13. The hub 27 of the brake element 26 is provided with peripheral teeth 33 with which teeth 34 on an annular friction element 35 mesh, the element 35 encompassing the hub and being adapted for rotation with the hub and also for lateral movement in directions lengthwise of the axis of the hub.

This element 35 stands between the friction elements 32 and the elements 32 in turn stand between the brake elements 23—26 so that when the brake elements 23—26 are relatively moved towards each other all of the friction elements will be gripped to retard the rotation of the shaft 14 but when the brake elements 23—26 are relatively moved away from each other the friction elements will be released and the rotation of the shaft 14 will not be retarded thereby.

Within the recess 19 of the hub 16 is disposed an annular member 36 having recesses 37 opening through one face thereof. In the hub 27 are also provided recesses 38 which open through one face thereof and register with the recesses 37 in the element 36 so that a coil spring 39 may be seated in the alined recesses.

Any number of recesses and springs 39 may be employed and these springs tend normally to force the brake elements 26 in a direction toward the brake element 23 to grip the friction elements 32—36 and thereby retard the rotation of the shaft 14.

The hub 27 and the element 36 may be held in their proper relative positions and against rotation one with respect to the other in any desired or suitable manner such as by means of bolts 40 passing loosely through the hub 27 and having a threaded end 41 threaded into a recess in the element 36. Each of the bolts is preferably provided with a head 42 which moves in a recess 43 in the hub 27. The bolts 40 are of such a length and the heads 42 are so positioned as not to interfere with the relative lateral movement of the hub 27 and the brake element 26 with respect to the element 36.

If desired, the brake element 23 may be provided with another circumferential flange 44 which projects over the hub 45 of the fly wheel 15, and packing material 46 may be provided between the flange 44 and the hub 45 of the fly wheel.

Supported adjacent the outer extremity of the shaft 14 is a bearing member 47 held in position in any suitable manner such as by means of a threaded collar 48 locked in position by means of bolts 49, and packing material 50 may be provided between the member 47 and the shaft 14, the member 47 being secured to the shaft 14 for rotation therewith in any suitable manner such as by means of a key or spline 51 which latter also serves to secure the hub 20 of the clutch member 22 and the hub 21 of the brake member 23 to the shaft for rotation therewith.

The member 47 is shaped to form a cylinder 52 in which a piston 53 is adapted to operate, suitable packing 54 being provided for the piston. The packing is held in position by means of a suitable packing gland 55 and the piston is guided and held against rotation in the cylinder 52 and with respect to the member 47 in any desired or suitable manner, such as by means of guide pins 56 operating in openings 57 in the member 47 and these guide pins are anchored to the piston in any suitable manner such as by means of nuts 58.

The piston 53 is provided with a circumferential flange 59 having peripheral threads 60 and telescoping with the flange is a member 61, the latter being provided with a flange 62 having openings 63 extending through the periphery thereof.

The member 61 is adapted to be adjusted with respect to the piston 53 in a manner and for a purpose to be described, by inserting an implement in one of the holes 63 and then rotating the member 61.

An adjustment member 64 is provided and is threaded upon the flange 59 of the piston which permits of adjustment between the piston 53 and flange 59, thereby giving adjustment to the clutch elements. Fastening bolts 66 may also be provided which pass transversely through the flange 62 and the adjustment member 64 for holding these parts against relative adjustment.

Another annular member 67 encompasses the shaft 14 and is provided with a flange 68 that contacts the flange 62, and the fastening bolts 66 also engage this flange 68 so as to lock the members 67—61—65 together. The member 67 constitutes a portion of the clutch mechanism and co-operates with the flange 22 on the section 20 of the clutch mechanism. This member 67 is provided on its inner periphery with teeth 69 that mesh with teeth 70 on a portion of the members 20 so that it will rotate with the member 20 but will be capable of lateral adjustment with respect thereto. Between the member 67 and the flange 22 of the hub 20 are arranged friction elements 71 which are annular in configuration and are provided on their outer periphery with teeth 72 which engage teeth 73 on an annular member 74, the latter being secured by suitable fastening devices 75 to the fly wheel 15 for rotation therewith.

Intermediate the friction elements 71 is a friction element 76 which is also annular and encompasses the shaft 14. This element 76 is provided on its inner periphery with teeth 77 which engage the teeth 70 on the clutch element 22. With this construction, when the fly wheel 15 is rotated the friction element 71 will be rotated therewith and with respect to the clutch members 67—22 and the friction element 76. When, however, the piston 53 is moved forwardly the friction elements will be gripped between the clutch members 67—22 and the fly wheel will be locked for rotation with the shaft 14.

The adjustment of the member 61 with respect to the piston 53 is provided so as to compensate wear of the friction elements. The movement of the piston 53 and with it the member 61 in one direction is accomplished by fluid pressure operated means, fluid pressure being admitted into the cylinder 52 from any suitable source through a passage 78 in the shaft which communicates with a passage 79 and this passage 79 communicates with a passage 80 to the wall of the cylinder.

This will render the clutch effective and will cause the shaft 14 to be rotated by the fly wheel, the latter being driven from any suitable source and in any suitable manner, (not shown).

When the fluid pressure in the cylinder 52 is reduced thereby rendering it possible to release the clutch, the piston 53 and the members 61—67 will be moved in the opposite direction by means of the springs 39. To that end there is provided any desired number of rods or pins 81 which pass through suitable openings in the members 20—21 of the respective clutch and brake elements. Any number of these pins or rods may be provided and one end thereof contacts the face of the hub 27 of the brake member 26. The other end of the pins or rods contact a collar or annular member 82 which is threaded into the hub of the member 61 and a relative adjustment of the members 61—82 may be effected, thereby resulting in an adjustment of the brake elements.

This annular member 82 is held against rotation with the member 61 in any desired or suitable manner, such as by means of pins 83 that project into the recesses 84 in the member 47, through a bearing member 85 and into a recess 86 in the annular member 82. This bearing member 85 may or may not be formed as a part of the member 47, the annular member 82 having bearing upon the member 85.

It is thought that the operation of the brake and clutch will be clearly understood from the foregoing, but briefly stated it is as follows:

The normal tendency of the springs 39 is to apply the brake by forcing the brake member 26 in a direction toward the brake member 23 to clamp the friction elements 32—35. This operation will occur when the cylinder 52 is relieved of fluid pressure and under such conditions the piston 53, member 61 and member 67 will be forced in a direction away from the clutch member 22, through the medium of the pins or rods 81 which engage the member 82, and the clutch will then be released.

When, however, it is desired to apply the clutch and release the brake, fluid pressure is admitted into the cylinder 52. The piston 53 will then be moved forwardly and with it the members 61—67, in directions toward the clutch member 22, thereby clamping the friction elements 71—76 so as to lock the fly wheel 15 for rotation with the shaft 14. As the piston 53 moves forwardly under fluid pressure forcing members 61—67 forwardly, the annular member 82 will be moved forwardly with the result that the pins or rods 81 will be shifted longitudinally and will move the brake members 27—26 in a direction away from the brake members 21—23, against the stress of the springs 39 thereby releasing the friction elements 32—35.

As soon as the fluid pressure is relieved or reduced sufficiently to be overcome by the stress of the springs 39, the reverse operation will take place, that is, the brake will be released and the clutch will be rendered active.

With this improved construction it will be manifest that a very compact unit will be provided and that the brake and clutch mechanism will be disposed in close proximity to each other with the fly wheel therebetween, with the result that the overhanging rotating mass and supports therefor, necessary in prior structures of this character, will be reduced in length and the weight of the overhanging mass will also be materially reduced. This is rendered possible by reason of the fact that supporting and overhanging brackets heretofore necessary have been dispensed with and this is rendered possible by reason of the fact that the stationary portion of the brake mechanism which has heretofore been secured or anchored to such overhanging brackets, is with the present structure anchored or secured directly to the face of the crown of the press.

At the same time there is provided a very compact unit and the adjustment mechanism to compensate wear in the friction creating portions is freely accessible from the outside of the unit, both the clutch and brake mechanism being adapted for independent adjustment.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A press embodying a frame, a driving shaft journaled in the frame and projecting a substantial distance beyond one of the walls of the frame, the shaft beyond the outer face of the frame being unsupported, friction brake mechanism, friction clutch mechanism, both of said mechanisms being supported by the shaft, a fly wheel supported by the shaft intermediate the brake and clutch mechanisms and maintained against movement laterally upon the shaft, and remote from the extremity of the projecting end of the shaft, mechanical means incorporated within said brake and rotatable with a portion of the brake for controlling said brake, and fluid pressure operated means incorporated within and rotatable with a portion of said clutch for controlling it, said fluid pressure operated means operating in opposition to the said mechanical means.

2. A press embodying a frame, a driving shaft journaled upon the frame, one end of said shaft projecting for a substantial distance beyond one of the walls of the frame, the shaft beyond the outer face of said wall being unsupported, a combined fly wheel, friction brake and friction clutch unit mounted upon the said end of the shaft, a portion of said brake being anchored directly to the outer face of said frame and against rotation with respect thereto, said fly wheel being disposed intermediate the brake and clutch and maintained against lateral movement upon said shaft, means individual to the brake and clutch and respectively incorporated therein and rotatable with the respective parts thereof for rendering them active, and means separate from and disposed between the clutch and brake for causing them to operate in opposition to each other.

3. A press embodying a frame, a shaft journaled upon the frame, one end of the shaft projecting for a substantial distance beyond a wall of the frame, the shaft beyond the outer face of said wall being unsupported, a combined fly wheel, friction brake and clutch unit mounted upon the said end of the shaft, and in proximity to the said frame, said fly wheel being disposed between the brake and clutch and in proximity to both and maintained against lateral movement upon the shaft, means securing a portion of the brake directly to the said frame against rotation with respect thereto, means individual to the brake and clutch and incorporated respectively therein and rotatable with one of the respective elements thereof for rendering them active, and means whereby when either the brake or the clutch is rendered active, the other will be rendered inactive.

4. A press embodying a frame, a shaft journaled upon the frame, one end of the shaft projecting for a substantial distance beyond a wall of the frame, the shaft beyond the outer face of said wall being unsupported, a combined fly wheel, brake and clutch unit mounted upon the said end of the shaft, and in proximity to the said frame, said fly wheel being disposed between the brake and clutch and in proximity to both, means securing a portion of the brake directly to the said frame against rotation with respect thereto, means individual to the brake and clutch for rendering them active and rotatable respectively with one of the elements thereof, and means whereby when either the brake or the clutch is rendered active, the other will be rendered inactive, the last said means embodying an element disposed between and engaging and operating upon one of the elements of the clutch and one of the elements of the brake.

5. A press embodying a frame, a shaft journaled upon the frame, one end of the shaft projecting for a substantial distance beyond a wall of the frame, the shaft beyond the outer face of said wall being unsupported, a combined fly wheel, brake and clutch unit mounted upon the said end of the shaft, and in proximity to the said frame, said fly wheel being disposed between the brake and clutch and in proximity to both, means securing a portion of the brake directly to the said frame against rotation with respect thereto, means individual to the brake and clutch and rotatable respectively with one of the respective elements thereof for rendering them active, and means whereby when either the brake or the clutch is rendered active, the other will be rendered inactive, said clutch embodying two members connected together for relative adjustment, one of said members being freely accessible from the outside of said unit for effecting such relative adjustment of the clutch elements.

6. A press embodying a frame, a shaft journaled upon the frame, one end of the shaft projecting for a substantial distance beyond a wall of the frame, the shaft beyond the outer face of said wall being unsupported, a combined fly wheel, brake and clutch unit mounted upon the said end of the shaft, and in proximity to the said frame, said fly wheel being disposed between the brake and clutch and in proximity to both, means securing a portion of the brake directly to the said frame against rotation with respect thereto, means individual to the brake and clutch and rotatable respectively with one of the respective elements thereof for rendering them active, and means whereby when either the brake or the clutch is rendered active, the other will be rendered inactive, said clutch embodying two members connected together for relative adjustment, one of said members being freely accessible from the outside of said unit for effecting relative adjustment of the clutch and the brake elements.

7. A press embodying a frame, a shaft journaled upon the frame, one end of the shaft projecting for a substantial distance beyond a wall of the frame, the shaft beyond the outer face of said wall being unsupported, a combined fly wheel, friction brake and friction clutch unit mounted upon the said end of the shaft and in proximity to the said frame, said fly wheel being disposed between the brake and clutch and in proximity to both, means for maintaining a portion of the brake directly against rotation with respect to the frame, means individual to the brake and clutch for rendering them active, and means whereby when either the brake or the clutch is rendered active, the other will be rendered inactive, one of the first recited means being fluid pressure operated, the said fluid pressure means being bodily incorporated within and rotatable with the element which is controlled thereby.

8. A press embodying a frame, a shaft journaled upon the frame, one end of the shaft projecting for a substantial distance beyond a wall of the frame, the shaft beyond the outer face of said wall being unsupported, a combined fly wheel, friction brake and friction clutch unit mounted upon the said end of the shaft and in proximity to the said frame, said fly wheel being disposed between the brake and clutch and in proximity to both, means for maintaining a portion of the brake against rotation with respect to the frame, means individual to the brake and clutch for rendering them active, and means extending through the fly wheel and engaging one of the elements of the brake and clutch whereby when either the brake or the clutch is rendered active, the other will be rendered inactive, one of the second recited means being mechanically operated and the other of said means being fluid pressure operated, the said fluid pressure operated means being incorporated within and bodily rotatable with the part controlled thereby.

9. In a press a frame, a shaft journaled upon the frame, one end of the shaft projecting for a substantial distance beyond a wall of the frame and being unsupported, a combined clutch, brake and fly wheel unit supported by said end of the shaft and in close proximity to said frame, means securing a portion of the brake directly to said frame and against rotation with respect thereto, said brake and clutch being disposed on opposite sides of said fly wheel and both in close proximity thereto, means individual to the brake and clutch for rendering them active, and means common to the brake and clutch for causing them to operate in opposition to each other, the last said means embodying an element extending through the fly and having contact with one of the elements of both the brake and clutch.

10. In a press a frame, a shaft journaled upon the frame, one end of the shaft projecting for a substantial distance beyond a wall of the frame and being unsupported, a combined friction clutch, friction brake and fly wheel unit supported by said end of the shaft and in close proximity to said frame, means securing a portion of the brake directly to said frame and against rotation with respect thereto, said brake and clutch being disposed on opposite sides of said fly wheel and both in close proximity thereto, means individual to the brake and clutch for rendering them active, and means common to the brake and clutch for causing them to operate in opposition to each other, one of the second recited means embodying a fluid pressure cylinder and piston unit embodied within and rotatable with the friction creating means controlled thereby.

11. As a unitary structure a fly wheel, friction brake and friction clutch, a shaft upon which said unit is mounted, said brake and clutch being disposed on opposite sides of said fly wheel and both in close proximity thereto, means for maintaining one of the elements of the brake against rotation, fluid pressure means incorporated within and operating to control at will said clutch, said fluid pressure means being bodily rotatable with the clutch element which is controlled thereby, and means separate from said clutch and brake and responsive to the operation of said clutch for causing the said brake to operate in opposition to the clutch.

12. As a unitary structure a fly wheel, friction clutch and friction brake, a shaft upon which the unit is mounted, said brake and clutch being disposed on opposite sides of the fly wheel and in close proximity thereto, means for maintaining one of the elements of the brake against rotation, fluid pressure actuated means incorporated within the clutch for controlling at will the clutch, means tending normally to render the brake active, and means separate from and disposed between an element of the clutch and an element of the brake and extending through the fly wheel, whereby said brake and clutch will be caused to operate in opposition to each other.

13. As a unitary structure a fly wheel, clutch and brake, a shaft upon which the unit is mounted, said brake and clutch being disposed on opposite sides of the fly wheel and in close proximity thereto, means for maintaining one of the elements of the brake against rotation, means incorporated within and bodily rotatable with an element of the clutch for controlling at will the said clutch, means tending normally to render the brake active, and means disposed between an element of the clutch and an element of the brake, whereby said brake and clutch will be caused to operate in opposition to each other, the last said means embodying an element extending through the fly wheel and being operable upon by an element of each of the brake and clutch.

EINAR K. JOHANSEN.